May 18, 1943 J. W. DAWSON Re. 22,314

CONTROL APPARATUS

Original Filed Dec. 19, 1930

WITNESSES:

Fred C. Wilkins

S. A. Strickler

INVENTOR

John W. Dawson

BY O. B. Buchanan

ATTORNEY

Reissued May 18, 1943

Re. 22,314

UNITED STATES PATENT OFFICE 22,314

CONTROL APPARATUS

John W. Dawson, Wilkinsburg, Pa., assignor to Westinghouse Electric & Manufacturing Company, a corporation of Pennsylvania Original No. 1,928,812, dated October 3, 1933, Serial No. 503,484, December 19, 1930. Application for reissue January 11, 1934, Serial No. 706,303

13 Claims. (Cl. 175—363)

Figure 1:
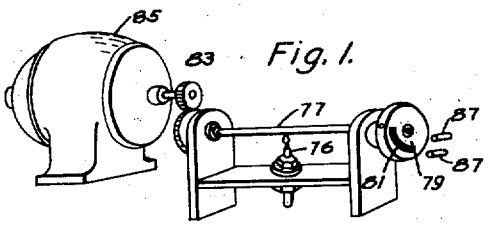

My invention relates to control apparatus and has particular relation to control apparatus of a type utilized in producing mechanical reciprocating or rotary motion of a predetermined period.

It is an object of my invention to provide control apparatus capable of delivering an electro-mechanical force of predetermined periodicity.

Another object of my invention is to provide control apparatus capable of delivering a periodic force of uniform magnitude.

A further object of my invention is to provide control apparatus capable of delivering an electro-mechanical force, the magnitude of which shall vary with uniform periodicity.

Another specific object of my invention is to provide apparatus for attaining a mechanical or electrical disturbance of predetermined properties from an electrical source having given properties.

An ancillary object of my invention is to provide, in control apparatus of a type incorporating an inductor, a device for preventing the inductor, by its electromagnetic action, from distorting the action of the control system proper.

Another ancillary object of my invention is to provide, in control apparatus of the type including an inductor, a device whereby the energy arising from a current of predetermined polarity, established in the inductor, is rapidly dissipated in an independent network provided therefor.

A further ancillary object of my invention is to provide in control apparatus of the type including a plurality of electric discharge tubes, that are periodically extinguished, and an inductor, a device whereby said inductor is prevented from influencing the condition of the tubes, by its magnetic action.

According to my invention I provide, a control system, for producing a periodic electro-magnetic force, of the type wherein the coil of an electro-magnet is periodically excited by the current traversing a grid controlled electric discharge tube. The potential of the grid of the tube is varied periodically by the action of a commutator disc that coacts with a source of potential independent of the source provided for operating the tube. The periodicity and the amplitude of the force is maintained uniform by reason of the fact that the commutator is rotated in synchronism with the alternations in the power source supplying the potentials for operating the tube.

According to a modification of my invention, the coil of the electro-magnet is excited from a plurality of tubes connected in push-pull relationship. By properly adjusting the number and the position of the segments of the commutator associated with the tubes, an electro-magnetic force of any predetermined characteristics may be produced with apparatus of this type.

Finally, the back-electromotive-force, arising from a current established in the coil of the electro-magnet, is prevented from perceptibly distorting the character of the disturbance that is delivered by the system by the action of a rectifier that is so connected in the system as to shunt the coil. I have found that by the addition of the rectifier, a rather aggravating fault has been remedied.

Figure 2:
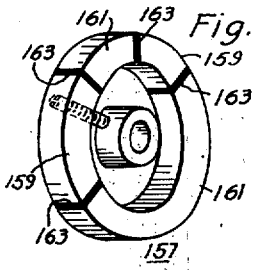

The novel features that I consider characteristic of my invention are set forth with particularity in the appended claims. The invention itself, however, both as to its organization and its method of operation, together with additional objects and advantages thereof, will best be understood from the following description of specific embodiments, when read in connection with the accompanying drawing, in which:

Fig. 1 is a view in perspective illustrating certain electrical and mechanical features of a commutator utilized in an embodiment of my invention, Fig. 2 is a perspective view of the sector disc of a commutator disc of a specific type.

Figure 3:
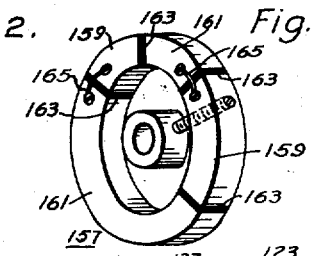
Figure 4:
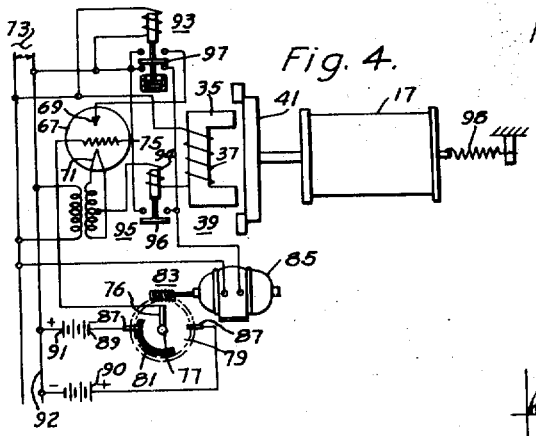
Figure 6:
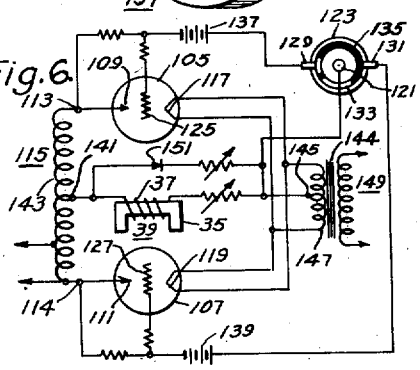
Figure 5:
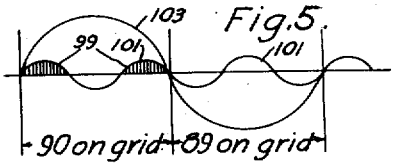
Figure 8:
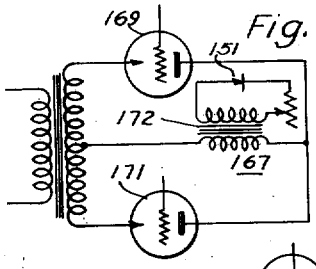
Figure 7:
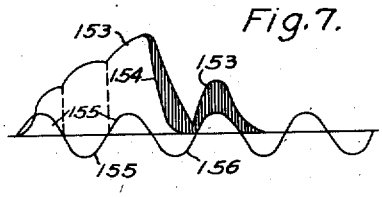
Figure 9:
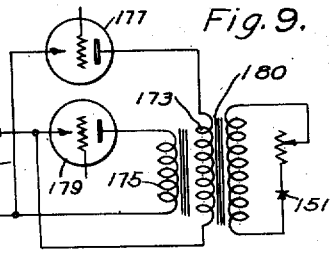

Fig. 3 is a second perspective view showing certain additional elements of the commutator disc, Fig. 4 is a schematic view showing the electrical circuit of an embodiment of my invention, Fig. 5 is a graph illustrating the action of the apparatus shown in Fig. 7, Fig. 6 is a schematic view showing a modification of my invention, Fig. 7 is a graph illustrating a characteristic of the apparatus shown in Fig. 9, and Figs. 8 and 9 are views illustrating further modifications of my invention.

The electrical circuit of a system embodying my invention is illustrated in Fig. 4. The apparatus comprises an electric discharge tube 67 (preferably a grid-control gas discharge or glow tube), the principal electrodes 69 and 71 of which are connected to the terminals of the coil 37 of a load device 39, and the power for the operation of which is supplied from an alternating current source 73.

The control electrode 75 of the tube 67 is connected through a brush 76, to the shaft 77 that supports a conducting disc 79 provided with an insulated sector 81 and rotated through a system of gears 83 from a synchronous motor 85. The power for the motor 85 is supplied from the same source 73 as supplies the potential between the anode 69 and the cathode 71 of the tube 67.

The disc 79 is engaged by a plurality of fixed brushes 87 that are connected to the terminals 89 and 90 of a power supply source 91 such as a battery. The remaining terminal 92 of the source 91 is connected to the anode 69 of the tube 67.

As the disc 79 rotates, a voltage of predetermined magnitude and of predetermined polarity is impressed on the grid 75 of the tube 67, and as a result the condition of the electric discharge in the tube 67 is varied. In apparatus of the type illustrated in Fig. 7, the grid 75 of the tube 67 is alternately adjusted to negative and positive potentials relative to the anode 69, and the tube is alternately in an unexcited and an excited state, respectively. The load device 39 in turn responds to the condition of the tube 67 and causes the screen to be reciprocated accordingly.

As illustrated in Fig. 4, the electric discharge tube 67 is of the hot cathode type. It is understood that plural electrode tubes of the cold-cathode type are also useable in reciprocating systems of the type described herein. However, where a comparatively heavy current is utilized, it is preferable that the tubes be of the hot cathode type and for the heaviest duty grid-controlled mercury pool cathode tubes are preferable.

The cathode 71 of the tube requires considerable time to be heated to a proper temperature for emitting, and it is seriously impaired if it emits before it reaches this temperature. A time delay relay 93 is therefore provided for preventing the application of the requisite potential between the anode 69 and the cathode 71 of the tube 67 until the cathode has attained a proper temperature.

Furthermore, it is understood that the potentials applied to the grid 75 by the contact disc 79 must be properly related in polarity to the potentials applied between the principal electrodes 69 and 71 of the tube 67 for satisfactory operation of the system. It is to be noted that the proper current is not passed by the tube 67 if the grid 75 is of negative polarity relative to the anode 69 at the beginning of each cycle of operation of the disc 79.

The coil 94 of relay 95, equipped with a contactor 96 that is adapted to regulate the activity of the motor circuit, is therefore included in the principal circuit of the tube 67. The contactor 96 is in parallel with the contactor 97 of the time delay relay 93 and when the latter closes the motor circuit is open unless the tube 67 is passing sufficient current. That is to say, power is not supplied to the motor 85 unless the disc 79 is properly oriented in phase relative to the alternations of voltage impressed between the principal electrodes of the tube 67.

Initially the motor 85 is started through the contactor 97 of the relay 93 which is in engagement with the lower fixed contacts of the relay when power is applied. When the cathode 71 is properly excited and the relay 93 is energized, the motor 85 can only be energized through the contactor 96 of the relay 95. If the disc 79 is so oriented at any time that the device 67 remains deenergized for an appreciable interval, the relay 95 is deenergized. When the supply of energy to the motor is thus stopped, its speed decreases and, in coasting, the disc necessarily passes through a condition in which the device 67 becomes energized and the relay 95 receives an impulse to energize it. It is evident that at the time that the relay 95 receives the energizing impulse the rotor of the motor 85 may be moving so slowly that it is pulled into proper step by the engagement of the contactor 96 with its corresponding fixed contacts regardless of how sluggish the relay 95 is. However, in the preferred practice of my invention the relay 95 is a rather quick acting relay.

It is well to point out that the relays 93 and 95 have not been shown in the modified systems illustrated in Figs. 6, 8 and 9. However, they have not been incorporated in the views for purposes of clarity. Their incorporation in the actual systems of the type shown in Figs. 4, 6, 8 and 9 will be apparent to one skilled in the art and the relay systems are, as a matter of fact, generally incorporated in actual apparatus of this type.

Finally, it is apparent that if tubes of the cold electrode type are utilized the time delay relay 93 is not necessary. The circuit is then slightly modified.

It is to be noted that as illustrated in Fig. 4, the restoring force for the movable member 17 in load device 39 is provided by a tension spring 98. This feature of the illustration should only be regarded as symbolical.

In Fig. 5, the action of the system shown in Fig. 4 is illustrated graphically. The shaded areas 99 under the curve 101 of comparatively small amplitude, represent the periods during which current is flowing through the tube 67. The curve 103, of large amplitude, indicates the position of the movable member 17. The values of positive ordinate, represent its position as it approaches the magnet 39, and the values of negative ordinate represent its position as it retracts from the magnet. The potentials 89 and 90 of the grid are designated below the axis of ordinates on the graph.

As can be seen from the graph, according to my invention, I provide, essentially, a device whereby a mechanical frequency of a predetermined period is attained from an electrical frequency of given period. In the particular case illustrated in the graph, the mechanical frequency is ⅓ of the electrical frequency. Thus, a frequency of 60 cycles, which is ordinarily available, yields a mechanical frequency of 20 cycles.

It is, furthermore, to be noted that by synchronizing the rotation of the sectored disc 79 with the alternations of the power supplied to the tube 67, I am able to obtain a condition wherein the oscillations of the member 17 are uniform in period and magnitude.

Apparatus of the type illustrated in Fig. 4 may be utilized to attain a mechanical mode of vibration comparatively simple in character. Modes of vibration of more complicated character may be attained with apparatus of the type illustrated in Fig. 6.

The apparatus illustrated in this view comprises a plurality of tubes 105 and 107, herein shown as hot-cathode grid-glow tubes, the anodes 109 and 111 of which are connected to two terminals 113 and 114 of a power-transmission transformer 115 and the cathodes 117 and 119 of which are connected to a shaft 121 whereon a commutator 123, of a predetermined character, is mounted.

The grids 125 and 127 of the tubes 105 and 107 are connected to brushes 129 and 131 that are adapted to make contact with the segments 133 and 135 of the rotating commutator 123 through power sources 137 and 139 of suitable electrical character. The exciting coil 37 of the electro-magnet 39 is connected between the electrical center 141 of the secondary 143 of the transformer 115, whereby power is supplied to the tubes 105 and 107, and the common electrical center 145 of the secondary 147 of the transformer 149, whereby power is supplied for heating the cathodes 117 and 119 of the tubes.

As is illustrated in the view, a negative bias is impressed on the grid 125 or the grid 127 of a tube 105 or a tube 107, when the brush 129 or the brush 131 associated therewith makes contact with the conducting element 133 of the commutator disc 123, and correspondingly, the grid is insulated when the brush makes contact with the insulating segment 135 of the commutator. In the latter case, the corresponding tube breaks down and a current passes through the exciting coil of the magnet.

It is seen that the condition produced in the electro-magnet is determined by the angle between the brushes 129 and 131 and by the angles subtended by the insulating and the conducting segments 133 and 135 of the commutator disc 123.

It has long been known that the passage of a current through an inductor causes a magnetic flux to be set up in the region associated therewith. When the current is decreased the flux decreases in turn, causing the current to maintain itself.

In the present connection, the persisting current tends to produce an electromotive force between the principal electrodes of the tubes 105 and 107 which in turn tends to maintain the tubes in a state of excitation. Consequently, the character of the mechanical vibrations that the system yields is distorted.

I have found that this undesirable condition may be eliminated by the addition of a rectifier 151 shunting the coil 37 of the load device 39 and of such polarity that the persisting current from the coil is dissipated in its circuit, and does not pass through the tubes 105 and 107. It is to be noted that when the current through the coil 37 decreases, the voltage across the rectifier is in such a direction as to cause it to pass current.

In Fig. 7 the curve 153, wholly above the axis of abscissae, illustrates the condition that is attained in the tubes when the shunting rectifier 151 is not present in the circuit, and the lower curve 154 illustrates the condition when the rectifier 151 is added to the circuit. If the discharge rectifier 151 is included in the circuit, the excess energy represented by the shaded area in Fig. 10 is dissipated therein. The ordinates of the curves may be regarded as proportional to the voltages impressed between the principal electrodes of the tubes in each case.

It will be noted that unless the current in the coil 37 and hence in the last tube is zero before the voltage of the anode 109 or 111 relative to the cathode 117 or 119 becomes positive, an increase in current in one tube, and therefore in the shaker-coil, results. The consequent motion of the shaker is therefore rather irregular. When it is remembered that the current in the coil 37 and consequently in the last tube to carry the current is, under ordinary circumstances, built up during several half-cycles 155 of the power supply source and is required to break down during one half-cycle 156 of the power source, the utility of the improvement, described above, is clearly seen.

It is to be noted that the discharge energy is dissipated in a resistor in the present embodiment of my invention. It is well to point out that in practice the energy may be fed back into the supply and rendered useful.

As with the apparatus of the type illustrated in Fig. 4, so also in the apparatus described hereinabove, the commutator disc 123 is synchronized with the alternations of the power supply source. The disc is driven from a synchronous motor 85 actuated from the same source as the tubes.

Under ordinary circumstances a commutator disc of the well-known type, having conducting and non-conducting segments, may be utilized. However, I have found that under certain conditions, it is advantageous to employ a disc 157 of the type shown in Figs. 2 and 3.

The disc 157 illustrated in these views comprises a plurality of metallic segments 159 and 161 separated by insulating strips 163. One segment 159 is connected conductively to the drive-shaft of the disc while the remaining segments 161 are insulated therefrom.

When the disc 157 is utilized in apparatus of the type illustrated in Fig. 6, at certain periods during the rotation of the disc, the brushes associated with the tubes are insulated, and as a result the tube corresponding to an insulated brush breaks down and produces a state of excitation in the electromagnet.

It is to be noted that the angle subtended by the segments of the commutator disc may be varied by connecting certain of the segments together with wires 165 bolted in the surface of the segments. The character of the movement produced in the mechanical vibrator may thus be varied.

In Figs. 8 and 9, modifications of my invention are illustrated.

In apparatus of the type illustrated in Fig. 8, the rectifier 151 provided for dissipating the energy arising from the back-current through the coil of the electro-magnet 167 is inductively coupled to the coil through which the tube current passes. The tubes 169 and 171 are illustrated as cold-cathode grid-blow tubes but the illustration should be regarded only as symbolical. The core 172 is analogous to the core 35 to which reference is made above.

In apparatus of the type illustrated in Fig. 9, independent coils 173 and 175 are provided to correspond to the individual tubes 177 and 179. These coils are magnetically coupled with each other and with the rectifier 151 that is provided for dissipating the energy arising from the back-current. The core 180 corresponds to the core 35 of the apparatus illustrated in Fig. 4.

It is well to point out that, although my invention has been illustrated as specifically applied to a mechanical vibrator, certain phases of it have more general applicability. In particular, it is well to reiterate that apparatus of the type illustrated in Fig. 4 or 6 may be utilized to attain a periodic electrical or mechanical disturbance of predetermined properties from a source of power having a series of given properties.

Again, it is to be noted that my invention should not be restricted to apparatus of a type wherein only grid-glow tubes are utilized. Electric discharge tubes of any type, such as thermionic valves or mercury discharge tubes, preferably with keep-alives, may be utilized in certain connections with success. It is, however, of interest to point out that for the present application the hot-cathode grid-glow tube of the type designated in Fig. 6 has been found most useful.

Specifically, it is to be noted that the specific orientation of power sources such as 93 and 137 and 139 should only be given symbolical significance. In apparatus of the type illustrated in Fig. 6, for example, the system can be operated with success if a power supply source is connected between the shaft 121 of the commutator disc 123 and the electrical center of the cathodes 117 and 119 of the tubes 105 and 107.

I have also found that satisfactory results may be attained with a tube the characteristics of which are such that it may be regulated by alternately connecting the grid to the anode and the cathode, or by alternately connecting the grid to one principal electrode and allowing it to float freely.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. Control apparatus comprising energy translating means, at least one electric discharge device incorporating a control electrode and a plurality of principal electrodes for transmitting power to said translating means, alternating power supply means for impressing an electromotive force between the principal electrodes of said electric discharge device, means operating in synchronism with said power supply means for alternately applying a distribution of potential between said control electrode and said principal electrodes to maintain said electric discharge device deenergized and another distribution of potential between said control electrodes and said principal electrodes to energize said electric discharge device, and means responsive to the current transmitted by said electric discharge device to maintain said potential-distribution-varying means in synchronism with said power supply means.

2. A power system comprising a source of alternating current, a load device, means including an electric valve provided with a control element connected to control only the flow of current from said source to said load device; and means for applying to said control element a periodic bias voltage and a voltage of greater amplitude and period than said bias voltage for permitting current to flow through said load device at times and for preventing current from flowing through said load device at other times.

3. An electrical converting system for transforming an electromotive force of given characteristics of frequency and amplitude into an electromotive force of predetermined different characteristics of frequency and amplitude, comprising a plurality of electric-discharge devices, each of said discharge device including a plurality of principal electrodes, and a control electrode, the potentials of said principal electrodes being applied from said given electromotive force, a rotating commutator device, a source of control power associated with said commutator device, the potentials of the control electrodes being applied through said commutator device from said source of control power and means for controlling the phase relation of the potentials applied to said control electrodes with respect to the phases of the potentials applied between said principal electrodes.

4. In an electric power system in combination, a load circuit, circuit means connecting the load circuit to a source of alternating current, a vapor-electric conducting means interposed in the circuit means for controlling and conducting the flow of current to said load circuit at a maximum in half cycle periods, and control means in the vapor-electric means for rendering said vapor-electric means conducting for half cycle or less intervals, said control means including means for interrupting the conductivity of said vapor-electric means after it has been conductive during a predetermined number of half cycles.

5. In an electric power system, in combination, a source of alternating current, a load circuit, circuit means connecting the source of alternating current to the load circuit, electronic means connected in series circuit relation with said circuit means, and control means connected to the electronic means for rendering the electronic means conducting at a maximum in half cycle periods during predetermined intervals and for maintaining said electronic means non-conductive during intermediate intervals.

6. In an electric power system, in combination, a source of alternating current, a load circuit, circuit means connecting the source of alternating current to the load circuit, electronic means connected in series circuit relation with said circuit means for conducting current at a maximum in half cycle periods, and control means connected to the electronic means and operable in synchronism with the source of alternating current for rendering the electronic means conducting for predetermined intervals.

7. In an electric power system, in combination, a source of alternating current, a load circuit, circuit means connecting the source of alternating current to the load circuit, electronic means connected in series circuit relation with said circuit means for conducting current at a maximum in half cycle periods, control means for rendering the electronic means conducting for a predetermined number of half cycles of the alternating current, and means for initiating the functioning of the control means.

8. Apparatus for supplying power to a load that requires pulses of current each of which is precisely of a predetermined magnitude comprising a source of alternating current, circuit means connecting said source to said load, electric discharge means interposed in said circuit means for controlling the flow of current through said circuit, and means for energizing said discharge means, maintaining said discharge means energized for an interval of time such that a pulse of current of said predetermined magnitude is supplied to said load and thereafter deenergizing said discharge means.

9. Apparatus for supplying power to a load that requires pulses of current each of which is precisely of a predetermined magnitude comprising a source of current, circuit means connecting said source to said load, means in said circuit means for conducting the flow of current through said circuit, said conducting means being normally non-conducting, and means for actuating said conducting means to conduct current, said conducting means including means whereby it is maintained in conductive condition for an interval of time such that a pulse of current of said predetermined magnitude is delivered to said load and is thereafter rendered non-conductive.

10. A power system comprising a load device, a source of periodically pulsating potential, means including an electric valve having a gaseous atmosphere of substantial pressure provided with a control element for supplying current to said load device from said source, and means for applying to said control element a periodic bias voltage of the same frequency as the source and a voltage opposite in effect to said bias voltage whose period is a multiple of the period of said bias voltage for controlling the conductivity of said valve.

11. In control apparatus of the type incorporating an inductor, alternating power supply means including a full wave electric discharge device having an energized and a deenergized condition, coupled to said inductor and to said power supply means, means for controlling the energization of said device so that it transmits unidirectional current impulses at least a period of the source in length through said inductor, the wave form of said impulses being substantially alike, means for suppressing the influence of the collapse of magnetic flux in said inductor, during said currentless intervals in maintaining said electric discharge device energized, said last-named means including an asymmetric network and means for coupling said network to said inductor in such manner that it is non-conductive to said unidirectional impulses transmitted through said inductor but is conductive to current impulses having the polarity of the potential generated by the collapse of said flux.

12. An electric timing device comprising a circuit adapted to have a current flow therein, a source of alternating current, means for initiating the flow of current in said circuit at any predetermined point on the voltage wave of said alternating current, and means for terminating said flow at a predetermined interval after said initiation.

13. In an electric timing device adapted to emit a series of current impulses, a synchronous motor, and means for regulating the length of each of said impulses according to the angular rotation of said motor.

JOHN W. DAWSON.